United States Patent [19]

Akimoto et al.

[11] Patent Number: 4,946,904
[45] Date of Patent: * Aug. 7, 1990

[54] ADDITIVES FOR CEMENT

[75] Inventors: Shin-ichi Akimoto; Susumu Honda, both of Tokyo; Tohru Yasukohchi, Kanagawa, all of Japan

[73] Assignee: Nippon Oil and Fats Co., Ltd., Tokyo, Japan

[*] Notice: The portion of the term of this patent subsequent to Aug. 7, 2007 has been disclaimed.

[21] Appl. No.: 193,699

[22] Filed: May 13, 1988

[30] Foreign Application Priority Data

May 15, 1987 [JP] Japan ................. 62-117036

[51] Int. Cl.$^5$ ............................... C08F 210/14
[52] U.S. Cl. ......................... 525/327.8; 524/5; 526/238.23; 526/271; 106/823; 106/724; 106/728; 106/802; 106/810
[58] Field of Search ............. 106/90, 314, 315; 524/5; 526/238.23, 271; 525/327.8

[56] References Cited

U.S. PATENT DOCUMENTS

| | | | |
|---|---|---|---|
| 3,563,930 | 2/1971 | Stram | 524/5 |
| 4,547,223 | 10/1985 | Goto et al. | 106/314 |
| 4,586,960 | 5/1986 | Iizuka et al. | 106/314 |
| 4,587,283 | 5/1986 | Hille et al. | 524/5 |
| 4,655,838 | 4/1987 | Koga et al. | 524/5 |
| 4,662,942 | 5/1987 | Koga et al. | 106/314 |
| 4,800,220 | 1/1989 | Ribba | 526/271 |

Primary Examiner—Mark L. Bell
Assistant Examiner—Deborah Jones
Attorney, Agent, or Firm—Sughrue, Mion, Zinn, Macpeak & Seas

[57] ABSTRACT

An additive for cement comprising, as the effective component, a copolymer of a polyoxyalkylene derivative represented by following formula (1) and maleic anhydride, a hydrolyzed product of the copolymer, or a salt of the hydrolyzed product;

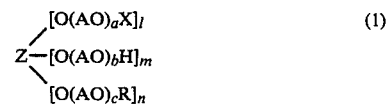

(1)

wherein Z represents a residue of a compound having a hydroxy group, said compound having from 2 to 8 carbon atoms; AO represents an oxyalkylene group having from 2 to 18 carbon atoms; X represents an unsaturated hydrocarbon group having from 2 to 5 carbon atoms or an unsaturated acyl group having from 2 to 5 carbon atoms; R represents hydrocarbon group having from 1 to 40 carbon atoms; a represents 0 to 1,000; b represents 0 to 1,000; c represents 0 to 1,000; l represents 1 to 7, m represents 0 to 2; and n represents 1 to 7; $l+m+n=2$ to 8, $m/(l+n) \leq \frac{1}{2}$, and $al+bm+cn \geq 1$.

8 Claims, No Drawings

ADDITIVES FOR CEMENT

FIELD OF THE INVENTION

This invention relates to an additive for cement, and more particularly to an organic additive for cement giving an excellent slump-loss preventing effect and dry shrinkage preventing effect.

BACKGROUND OF THE INVENTION

As organic compounds being added to cement, a naphthalenesulfonate-formaldehyde condensate, a melamine-sulfonate-formaldehyde condensate, a lignin-sulfonate, etc., are used as a water reducing agent and also polyethylene glycol methyl ether, polyoxyethylenepolyoxypropylene glycol, etc., are used as a dry shrinkage preventing agent.

These additive are used in the case of kneading a composition composed of cement, water, etc. However, although these additives may have an effect of reducing the amount of water at use or an effect of preventing the occurrence of dry shrinkage after operation, the use of these additives cannot avoid the reduction with time in fluidity of the cement composition (so-called slump-loss).

Japanese Patent Application (OPI) No. 162162/84 (the term "OPI" as used herein indicates an "unexamined published application") discloses that the use of a naphthalenesulfonate-formaldehyde condensate or a melaminesulfonate-formaldehyde condensate together with a copolymer of an allyl alcohol (alkylene oxide addition product) and an unsaturated dicarboxylic acid (alkylene oxide addition product) is effective for the improvement of the slump-loss but the effect is not always sufficient.

The slump-loss is the most serious problem in the field of cement industry. If the problem is solved, not only the loss at the application of concrete is reduced but also the usable life or period of concrete is greatly prolonged. Thus, early solving of the problem has been desired.

SUMMARY OF THE INVENTION

The object of this invention is, therefore, to provide an additive for cement, which has an excellent effect of preventing the occurrence of slump-loss as well as an effect of preventing the occurrence of dry shrinkage of concrete.

According to this invention, there is provided an additive for cement (hereinafter, referred to as additive) comprising a copolymer of a polyoxy-alkylene derivative represented by the following formula (1) and maleic anhydride, a hydrolyzed product of the copolymer, or a salt of the hydrolyzed product as the effective component;

(1)

wherein B represents a residue of a compound having from 2 to 8 hydroxy groups; AO represents an oxyalkylene group having from 2 to 18 carbon atoms; X represents an unsaturated hydrocarbon group having from 2 to 5 carbon atoms or an unsaturated acyl group having from 2 to 5 carbon atoms; R represents a hydrocarbon group having from 1 to 40 carbon atoms; represents 0 to 1,000; b represents 0 to 1,000; represents 0 to 1,000; l represents 1 to 7; m represents 0 to 2; and n represents 1 to 7; $l+m+n=2$ to 8, $m/(l+n) \leq \frac{1}{2}$, and $al+bm+cn \geq 1$

DETAILED DESCRIPTION OF THE INVENTION.

The invention is explained in detail below.

In formula (1) described above, Z represents a residue of a compound having from 2 to 8 hydroxy groups, and examples of the compound are polyhydric phenols such as catechol, resorcin, hydroquinone, phloroglucin, etc.; polyhydric alcohols such as ethylene glycol, propylene glycol, butylene glycol, dodecylene glycol, octadecylene glycol, neopentyl glycol, styrene glycol, glycerol, diglycerol, polyglycerol, trimethylolethane, trimethylolpropane, 1,3,5-pentanetriol, erythritol, pentaerythritol, dipentaerythritol, sorbitol, sorbitan, sorbide, a sorbitol-glycerol condensate, adonitrol, arabitol, xylitol, mannitol, etc.; saccharides such as xylose, arabinose, ribose, rhamnose, glucose, fructose, galactose, mannose, sorbose, cellobiose, maltose, isomaltose, trehalose, sucrose, raffinose, gentianose, melezitose, etc.; and the partially etherified compounds and partially esterified compound thereof.

As the oxyalkylene group having from 2 to 18 carbon atoms shown by AO in formula (1) may be mentioned an oxyethylene group, an oxypropylene group, an oxybutylene group, an oxytetramethylene group, an oxystyrene group, an oxydodecylene group, an oxytetradecylene group, an oxyhexadecylene group, an oxyoctadecylene group, etc., and in particular an oxyalkylene group having from 1 to 4 carbon atoms is preferred.

As the unsaturated hydrocarbon group having from 2 to 5 carbon atoms or the unsaturated acyl group having 2 to 5 carbon atoms shown by X may be mentioned a vinyl group, an allyl group, a methallyl group, a 3-butenyl group, a 4-pentenyl group, a 3-methyl-3-butenyl group, an acryl group, a methacryl group, a vinylacetyl group, an allylacetyl group, etc., and an acryl group and a methacryl group are particularly preferred.

As the hydrocarbon group having from 1 to 40 carbon atoms shown by R may be mentioned a methyl group, an ethyl group, a propyl group, an isopropyl group, a butyl group, an isobutyl group, a tert-butyl group, an amyl group, an isoamyl group, a hexyl group, a heptyl group, a 2-ethylhexyl group, an octyl group, a nonyl group, a decyl group, an undecyl group, a dodecyl group, an isotridecyl group, a tetradecyl group, a hexadecyl group, an isohexadecyl group, an octadecyl group, an isooctadecyl group, an oleyl group, an octyldodecyl group, a docosyl group, a decyltetradecyl group, a benzyl group, a cresyl group, a butylphenyl group, a dibutylphenyl group, an octylphenyl group, a dinoxylphenyl group, a naphthyl group, a styrenated phenyl group, etc., and the hydrocarbon groups having from 1 to 24 carbon atoms are particularly preferred.

The hydrolyzed product of the aforesaid copolymer is a product of a hydrolyzed maleic acid unit resulting from the hydrolysis of maleic anhydride unit in the copolymer.

The salt of the hydrolyzed product of the copolymer shown by R is a salt formed by the aforesaid maleic acid unit and there are alkali metal and alkaline earth metal salts such as a lithium salt, a sodium salt, a potassium salt, a magnesium salt, a calcium salt, etc., as well as ammonium salts and organic amine salts.

As the organic amine salt may be mentioned aliphatic and aromatic monoamine salts such as a methylamine salt, an ethylamine salt, a propylamine salt, a butylamine salt, an amylamine salt, a hexylamine salt, an octylamine salt, a 2-ethylhexylamine salt, a decylamine salt, a dodecylamine salt, an isotridecylamine salt, a tetradecylamine salt, a hexadecylamine salt, an isohexadecylamine salt, an octadecylamine salt, an isooctadecylamine salt, an octyldodecylamine salt, a docosylamine salt, a decyltetradecylamine salt, an oleylamine salt, a linolamine salt, a dimethylamine salt, a trimethylamine salt, an aniline salt, etc.; polyamine salts such as an ethylenediamine salt, a tetramethylenediamine salt, a dodecylpropylenediamine salt, a tetradecylpropylenediamine salt, a hexadecylpropylenediamine salt, an octadecylpropylenediamine salt, an oleylpropylenediamine salt, a diethylenetriamine salt, a triethylenetetramine salt, a tetraethylenepentamine salt, a pentaethylenehexamine salt, etc.; alkanolamine salts such as a monoethanolamine salt, a diethanolamine salt, a triethanolamine salt, a monoisopropanolamine salt, a diisopropanolamine salt, a triisopropanolamine salt, salts of the alkylene oxide addition products of these amines, salts of the alkylene oxide addition products of primary or secondary amines, etc.; and amino acid salts such as a lysine salt, an arginine salt, etc.

Of these salts, alkali metal salts, ammonium salts and alkanolamine salts are particularly preferred.

In the additive of this invention, it is preferred that the molar ratio of the portion of the unsaturated bond shown by X in formula (1) to the portion of maleic anhydride, maleic acid, or a maleate is from 3:7 to 7:3, particularly about 1:1.

The number of carbon atoms in group X has a relation with the polymerizability, and if the number of carbon atoms is too large, the additive become less polymerizable and thus the number of carbon atoms from 2 to 5 is suitable.

When l in formula (1) is 1 (i.e., the number of X is 1), a straight copolymer is formed, while if l is 2 or more, a crosslinked copolymer is formed.

In regard to the relation of l, m, and n, m may be in the range of from 0 to 2 and if m is too large, an ester is liable to be formed. If an ester is formed, the copolymer is unpreferably hydrolyzed at use for cement and m is thus preferably less. Accordingly, in the relation of l, m, and n, $m/(l+n) \geq \frac{1}{2}$ is preferred.

Also, b, and each is from 0 to 1,000 and $al+bm+cn \geq 1$, particularly preferably $al+bm+cn = 1$ to 300.

By suitably selecting a combination of the number of carbon atoms in group AO, the addition number thereof, and R, the additive of this invention can be rendered hydrophilic or lipophilic. That is, when AO is an oxyethylene group alone or a mixture of at least 25% oxyethylene group and other oxyalkylene group, the additive of this invention becomes hydrophilic but in other cases, it becomes lipophilic. When the additive of this invention is lipophilic, the additive is sparingly mixed with cement but, since such an additive shows defoaming property, the additive can be advantageously used for avoiding the undesired foams.

Both the hydrophilic copolymer and the lipophilic copolymer are effective as an additive for cement but, when the slump-loss prevention effect and the dry shrinkage prevention effect only are aimed without considering other performances such as defoaming property, etc., the effect of the copolymer which is soluble in water to some extent is best, while in the cases of the copolymer which is either soluble to any extent or insoluble in water the effect lowers a little.

The copolymer can be easily obtained by copolymerizing the compound of formula (1) and maleic anhydride, maleic acid or a maleate, using a peroxide catalyst. In this case, the copolymerization can be carried out in the presence of other copolymerizable components such as styrene, α-olefin, vinyl acetate, etc.

There is no particular restriction posed on the number average molecular weight of the copolymer in this invention but is usually from 1,000 to 200,000 and the copolymer having at least 4 acid or salt moieties in one molecule is preferred.

By suitably changing Z, AO, X, R, l, m, and n of the compound shown by formula (1), the additive of this invention can be changed from a water-soluble liquid to a solid difficultly soluble in water. The additive of this invention can be used as both an aqueous solution and a powder. From the view point of workability, it is better to use as an aqueous solution in the case of a liquid copolymer or as a mixture of cement and the powdered copolymer in the case of the solid copolymer.

The amount added of the additive of this invention is from 0.05 to 5% by weight, and preferably from 0.2 to 2% based on the weight of cement.

As described above, the additive of this invention is composed of the copolymer of the aforesaid copolymerizable polyoxyalkylene derivative of formula (1) and maleic anhydride, the hydrolyzed product of the copolymer, or a salt of the hydrolyzed product as the effective component and has excellent effects of preventing slump-loss and preventing dry shrinkage.

EXAMPLE

The test was carried out using the products of this invention and the comparison products shown in Table 1 below as additives. All percentages (%) are by weight.

| Compounding Composition | |
|---|---|
| Water | 165 kg/m$^3$ |
| Cement | 300 kg/m$^3$ |
| Sand | 758 kg/m$^3$ |
| Gravel (largest size 25 mm) | 1067 kg/m$^3$ |
| Air Entraining and Water Reducing Agent (Pozzolith No. 5L, trade name, made by Nisso Master Builders Col., Ltd.) | 0.75 kg/m$^3$ |
| Additive (1% to cement) | 3.0 kg/m$^3$ |
| Water/cement Ratio | 55.0% |
| Sand Percentage | 42.0% |

The aforesaid components were kneaded in a mortar mixer at 4 r.p.m. and the slump-loss was measured every 30 minutes until 90 minutes. After 90 minutes (but after 60 minutes for No. 12, No. 13 and No. 17 in Table 1), each sample of 10×10×40 cm$^3$ was prepared, released from a mold after one day, cured in water up to the age of 7 days at 20° C., and then allowed to stand under the conditions of 20° C. and 65% in relative humidity, the dry shrinkage of each sample was measured using a comparator method.

In addition, for reference, the compressive strength was also measured on each sample which had been allowed to stand up to the age of 35 days in the aforesaid conditions.

The results obtained are shown in Table 2.

It can be seen from Table 2 that the products of this invention are excellent in the slump-loss prevention effect and the dry shrinkage prevention effect and give no influence on strengths such as compressive strength, etc.

TABLE 1

| Sample No. | Compound of Formula (1) (mol)* | Maleic Anhydride (mol) | Other Monomer (mol) | Salt (Neutralization Degree) | Number Average Molecular Weight |
|---|---|---|---|---|---|
| 1** | $CH_2=CHCH_2O(C_2H_4O)_9CH_3$ | 1.0 | 1.0 | — | — | 7,000 |
| 2** | $CH_2=CHCH_2O(C_2H_4O)_9CH_3$ | 1.0 | 1.0 | — | — | 20,000 |
| 3** | $CH_2=\overset{CH_3}{\underset{|}{C}}CH_2O\{(C_3H_6O)_7(C_2H_4O)_{10}\}C_{18}H_{37}$ | 1.0 | 1.0 | — | Triethanolamine (40%) | 13,000 |
| 4** | $CH_2=CHCH_2OCH_2\underset{\underset{O(C_3H_6O)_5(C_2H_4O)_5H}{|}}{CH}CH_2O(C_3H_6O)_5(C_2H_4O)_5CH_3$ | 1.0 | 1.0 | — | — | 9,000 |
| 5** | $CH_2=CHCH_2O(C_2H_4O)_{10}\text{-}\bigcirc\text{-}C_9H_{19}$ | 0.9 | 1.0 | — | — | 10,000 |
|  | $CH_2=\overset{CH_3}{\underset{|}{C}}\text{-}COO(C_2H_4O)_8CH_3$ | 0.1 | | | | |
| 6** | $CH_2=CHCH_2OCH_2\text{-}C[CH_2O(C_3H_6O)_3(C_2H_4O)_{20}CH_3]_3$ | 0.9 | 1.0 | Styrene 0.1 | Sodium (30%) | 12,000 |
| 7** | $CH_2=CHCH_2O\{(CH_2\overset{C_2H_5}{\underset{|}{CH}}O)_2(C_2H_4O)_7\}C_4H_9$ | 0.9 | 1.0 | — | — | 110,000 |
|  | $CH_2=CHCH_2O(C_2H_4O)_{200}CH_2CH=CH_2$ | 0.05 | | | | |
| 8** | $CH_2=\overset{CH_3}{\underset{|}{C}}\text{-}CH_2O\{(CH_2CH_2CH_2CH_2O)_3(C_3H_6O)_8\}CH_3$ | 1.0 | 1.0 | — | Potassium (50%) | 4,000 |
| 9** | $CH_2=CHCH_2OCH_2$*** <br> $\underset{|}{[CHO(C_2H_4O)_{10}H]_2}$ <br> $\underset{|}{[CHO(C_2H_4O)_{10}CH_3]_2}$ <br> $CH_2O(C_2H_4O)_{10}CH_3$ | 0.1 <br> 0.9 | 1.0 | — | Ammonia (30%) | 16,000 |
|  | $CH_2=CHCH_2O(C_3H_6O)_{20}C_4H_9$ | 0.9 | | | | |
| 10** | $CH_2=\overset{CH_3}{\underset{|}{C}}\text{-}CH_2CH_2O(C_2H_4O)_{10}CH_3$ | 0.5 | 1.0 | — | — | 16,000 |
|  | $CH_2=C\text{-}CH_2OCH_2\underset{\underset{O(C_2H_4O)_7CH_3}{|}}{CH}CH_2OC_{12}H_{25}$ | 0.5 | | | | |
| 11** | $CH_2=CHCH_2O(C_3H_6O)_3(C_2H_4O)_{10}\text{-}\bigcirc\text{-}C_8H_{17}$ | 0.7 | 1.0 | Diglycerol Diallyl Ether: 0.05 Acrylic Acid: 0.25 | — | 70,000 |
| 12** | $HO\{(C_3H_6O)_7(C_2H_4O)_3\}H$ | | | | | 550 |
| 13**** | Sodium Naphthalenesulfonate-Formaldehyde Condensate | | | | | 4,000 |
| 14**** | — | | 1.0 | Diisobutylene 1.0 | Sodium (80%) | 5,000 |
| 16**** | — | Maleic Acid 1.0 | ***** 1.0 | | Sodium (100%) | 7,000 |
| 17**** | None | | | | | |

Notes:
*{ } shows random addition product
**Present Invention
***Sorbitol Derivative
****Comparison
*****$CH_2=CHCH_2O(C_2H_4O)_3H$

TABLE 2

| Sample No. | Slump (cm) Immediately After Kneading | After 30 min. | After 60 min. | After 90 min. | Dry Shrinkage (%) 7 Days | 14 Days | 28 Days | Compressive Stength (kg/cm³) |
|---|---|---|---|---|---|---|---|---|
| 1* | 17.2 | 17.0 | 16.5 | 15.6 | 0.020 | 0.033 | 0.042 | 405 |
| 2* | 17.7 | 17.5 | 17.3 | 17.0 | 0.018 | 0.030 | 0.036 | 411 |
| 3* | 18.0 | 17.9 | 17.8 | 17.5 | 0.017 | 0.030 | 0.036 | 407 |
| 4* | 18.0 | 17.8 | 17.4 | 17.2 | 0.018 | 0.032 | 0.039 | 413 |
| 5* | 17.9 | 17.6 | 17.4 | 17.2 | 0.020 | 0.032 | 0.040 | 407 |
| 6* | 17.8 | 17.5 | 17.0 | 16.8 | 0.019 | 0.030 | 0.037 | 407 |
| 7* | 17.4 | 17.2 | 17.0 | 16.7 | 0.020 | 0.033 | 0.044 | 402 |
| 8* | 16.5 | 16.0 | 15.3 | 14.4 | 0.017 | 0.029 | 0.032 | 411 |
| 9* | 17.7 | 17.5 | 17.3 | 17.1 | 0.018 | 0.030 | 0.038 | 409 |
| 10* | 18.0 | 17.9 | 17.7 | 17.4 | 0.020 | 0.035 | 0.038 | 418 |
| 11* | 17.6 | 17.4 | 17.2 | 16.9 | 0.020 | 0.034 | 0.041 | 415 |
| 12** | 16.0 | 12.2 | 9.0 | *** | 0.013 | 0.029 | 0.030 | 420 |
| 13** | 17.3 | 12.5 | 8.8 | *** | 0.024 | 0.046 | 0.060 | 400 |
| 14** | 17.4 | 15.8 | 13.8 | 12.9 | 0.025 | 0.044 | 0.060 | 393 |
| 15** | 17.2 | 15.5 | 13.0 | 11.8 | 0.024 | 0.046 | 0.061 | 395 |
| 16** | 17.1 | 16.3 | 14.5 | 13.7 | 0.025 | 0.048 | 0.062 | 397 |
| 17** | 14.0 | 11.2 | 8.3 | *** | 0.026 | 0.046 | 0.060 | 395 |

While the invention has been described in detail and with reference to specific embodiments thereof, it will be apparent to one skilled in the art that various changes and modifications can be made therein without departing from the spirit and scope thereof.

What is claimed is:

1. An additive for cement comprising, as the effective component, a copolymer of a polyoxyalkylene compound represented by the following formula (1) and maleic anhydride, a hydrolyzed product of the copolymer, or a salt of the hydrolyzed product;

     (1)

wherein B represents a residue of a compound having from 2 to 8 hydroxy groups; AO represents an oxyalkylene group having from 2 to 18 carbon atoms; X represents an unsaturated hydrocarbon group having from 2 to 5 carbon atoms or an unsaturated acyl group having from 2 to 5 carbon atoms; R represents hydrocarbon group having from 1 to 40 carbon atoms; represents 0 to 1,000; b represents 0 to 1,000; represents 0 to 1,000; l represents 1 to 7, m represents 0 to 2; and n represents 1 to 7; $l+m+n=2$ to 8, $m/(l+n) \leq \frac{1}{2}$, and $al+bm+cn \geq 1$.

2. The additive for cement as in claim 1, wherein AO is an oxyalkylene group having from 2 to 4 carbon atoms; X is an alkenyl group having from 2 to 5 carbon atoms; and R is a hydrocarbon group having from 1 to 24 carbon atoms.

3. The additive for cement as in claim 1, wherein the number average molecular weight of the copolymer is from 1,000 to 200,000.

4. A cement composition containing a cement and a copolymer of a polyoxyalkylene compound represented by the following formula (1) and maleic anhydride, a hydrolyzed product of the copolymer, or a salt of the hydrolyzed product;

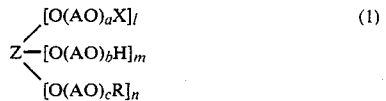     (1)

wherein Z represents a residue of a compound having from 2 to 8 hydroxy groups; AO represents an oxyalkylene group having from 2 to 18 carbon atoms; X represents an unsaturated hydrocarbon group having from 2 to 5 carbon atoms or an unsaturated acyl group having from 2 to 5 carbon atoms; R represents hydrocarbon group having from 1 to 40 carbon atoms; a represents 0 to 1,000; b represents 0 to 1000; c represents 0 to 1,000; l represents 1 to 7, m represents 0 to 2; and n represents 1 to 7; $l+m+n=2$ to 8, $m/(l+n) \leq \frac{1}{2}$, and $al+bm+ \geq 1$.

5. A cement composition according claim 4, AO is an oxyalkylene group having from 2 to 4 carbon atoms; X is an alkenyl group having from 2 to 5 carbon atoms; and R is a hydrocarbon group having from 1 to 24 carbon atoms.

6. A cement composition according to claim 4, wherein the number average molecular weight of the copolymer is from 1,000 to 200,000.

7. The cement composition according to claim 4, wherein the copolymer is present in an amount of from 0.05 to 5% by weight based on the weight of cement.

8. The cement composition according to claim 4, wherein the copolymer is present in an amount of from 0.02 to 2% by weight based on the weight of cement.

* * * * *